(12) United States Patent  (10) Patent No.: US 8,132,522 B2
Ecker  (45) Date of Patent: Mar. 13, 2012

(54) METHOD AND DEVICE FOR PROCESSING BELT MATERIAL

(75) Inventor: Andreas Ecker, Nürtingen (DE)

(73) Assignee: RSG Automation Technics GmbH & Co. KG, Bietigheim-Bissingen (DE)

( * ) Notice: Subject to any disclaimer, the term of this patent is extended or adjusted under 35 U.S.C. 154(b) by 638 days.

(21) Appl. No.: 12/282,167

(22) PCT Filed: Mar. 7, 2007

(86) PCT No.: PCT/EP2007/001978
§ 371 (c)(1),
(2), (4) Date: Sep. 8, 2008

(87) PCT Pub. No.: WO2007/101683
PCT Pub. Date: Sep. 13, 2007

(65) Prior Publication Data
US 2009/0050663 A1  Feb. 26, 2009

(30) Foreign Application Priority Data
Mar. 7, 2006 (DE) .......................... 10 2006 010 533
Oct. 26, 2006 (DE) .......................... 10 2006 050 611

(51) Int. Cl.
*D05B 23/00* (2006.01)
*D05B 35/00* (2006.01)
(52) U.S. Cl. ......... 112/475.06; 112/475.08; 112/470.16; 112/470.33

(58) Field of Classification Search ............. 112/470.33, 112/470.34, 147, 152, 475.06, 475.08
See application file for complete search history.

(56) References Cited

U.S. PATENT DOCUMENTS

| | | | | |
|---|---|---|---|---|
| 2,770,204 A * | 11/1956 | Brownstein | ............. | 112/470.33 |
| 2,848,147 A * | 8/1958 | Alfandre | ......................... | 223/49 |
| 3,785,907 A * | 1/1974 | Barr et al. | ..................... | 156/443 |
| 4,046,089 A * | 9/1977 | Asel et al. | ................ | 112/470.33 |
| 4,137,856 A * | 2/1979 | Brauns et al. | ................. | 112/104 |
| 4,157,687 A * | 6/1979 | Cislak | ....................... | 112/470.33 |
| 4,287,841 A * | 9/1981 | Rovin | ...................... | 112/470.03 |
| 4,527,491 A * | 7/1985 | Block et al. | .................. | 112/104 |
| 4,955,637 A * | 9/1990 | Huber et al. | ................ | 280/801.1 |
| 5,255,619 A * | 10/1993 | Brunelli et al. | ................. | 112/63 |
| 5,570,648 A * | 11/1996 | Burt et al. | ................ | 112/470.33 |
| 7,516,711 B2 * | 4/2009 | Messner et al. | .......... | 112/475.01 |

* cited by examiner

*Primary Examiner* — Ismael Izaguirre
(74) *Attorney, Agent, or Firm* — Tracy M. Heims; APEX JURIS, pllc

(57) ABSTRACT

The present invention relates to a method and to a device for processing highly flexural material in strip form. In order to provide a method and a corresponding device for processing highly flexural material 2 in strip form with optimization of working processes and increased production reliability, it is proposed that, in a method for processing highly flexural material 2 in strip form with a first and a second end region 10, 16, in particular of textile belt material 2, the two end regions 10, 16 of the highly flexural material 2 are essentially processed simultaneously, wherein one of the types of processing includes at least one sewing operation. In this case, ensured and consistent quality is achieved with a shortened working cycle time.

15 Claims, 6 Drawing Sheets

METHOD AND DEVICE FOR PROCESSING BELT MATERIAL

The present invention relates to a method and a device for processing pliable material in strip form.

Within the context of the description of the present invention, the term "pliable" denotes materials that substantially can only be stressed and conveyed under tension, because almost no bending moment can exert an effect in them. The term "strip form" denotes material having a geometry in which the length is significantly larger than the width or height, as is the case, in particular, in textile belt material. Thus, textile belt materials are important representatives of a group of materials with the aforementioned properties. Apart from safety belts and/or load-carrying belts made of synthetic textiles, belt materials of leather, rubber or plastics, such as, for example, metal or plastic sheets or PVC materials with or without incorporated reinforcing fibers exhibit pliable characteristics as materials in strip form.

Without limiting the invention, only the fabrication of safety belts for motor vehicles is addressed below by way of example. According to known working methods, safety belts are, as a rule, manufactured in a chain of operating positions which, as individual operating positions, are respectively provided with intermediate input and output buffers. Starting with a belt material measured off to have a length of between, for example, 3.80 m and about 5.40 m, a pin pocket in a known method is manually folded, sewn and manually equipped at an operating position with a pushed-in pin held in the pin pocket by clamping. In some cases, a label is applied in this area. The belt material is then put into a roll-up belt drum or winding device and subsequently pulled through manually until the pin pocket thickened by the pin comes to rest, fixed in a final position in the belt drum.

In the known method, the pre-assembled safety belt is then subjected to a so-called pendulum test for testing the performance of the belt drum. Finally, the belt material is equipped with a locking or fastening plate and with a deflection device and provided with a retaining rivet. In any case, a second free end of the belt material is now looped through an end fitting, folded and sewn together. As a rule, the label is introduced prior to sewing. This eyelet-shaped end stop together with the belt drum constitutes the solid fixing points of a safety belt in the area of, for example, a B pillar of a motor vehicle. The deflection device forms a slide bearing which retains the safety belt on the B pillar in the area of a seat back of a seat, ready to be fastened after getting into the vehicle. The final inspection is followed by the packaging of the now ready-to-use, prefabricated safety belt.

It is the object of the present invention to provide a method and a corresponding device for processing pliable material in strip form while optimizing work processes at an enhanced reliability of production.

This object is achieved by the features of the independent claims. Accordingly, a device according to the invention for processing pliable material in strip form, in particular textile belt material, having a first and a second end portion, is characterized by processing units being provided for substantially simultaneously processing the first and the second end portion, wherein the two end portions of the pliable material are being processed in a different manner and at least one sewing process is part of one of the manners of processing. Thus, the realization that a pliable material in strip form has two substantially simultaneously processable end portions forms the basis of the method according to the invention and of a device formed accordingly. Thus, a substantial amount of working hours can be saved, with production reliability being increased by the connection and even overlapping use of hitherto separate work stations, due to the omission of semi-automated transport steps and positioning steps that are generally carried out manually. Since the two end portions are also located in a fixed position relative to each other during a respective processing process, this also results in an optimization of working processes including a safeguarding against operating and equipping errors within the sense of a poka-yoke-system, i.e. by intentionally avoiding possible errors and error sources in fabrication.

Additional advantageous features are the subject matter of the respective dependent claims. In a preferred embodiment of the invention, the first end portion, in the first processing unit, is thus folded and sewn together while a pin is introduced, the insertion preferably taking place automatically. Thus, in the first processing unit, the working processes of inserting, equipping, folding and sewing are carried out on the first end portion. Preferably substantially simultaneously with the processing steps in the first processing unit, the pliable material in strip form, in a second processing unit, is measured off to have a defined length with subsequent hot separation and post-processing of the cutting edges, in particular in the form of a flattening process after hot cutting and/or as a heat deformation of the cutting edges.

Advantageously, the preprocessed pliable material is pulled out of the first processing unit while the second end portion is threaded into and guided through a retractor mechanism. Thus, a separate ejection mechanism can be dispensed within the first processing unit described above with respect to possible fabrication steps. In addition, the further transfer of the strip of material can already be begun while processing is still being carried out in the first processing unit.

In a preferred embodiment of the invention, following the second end portion being guided through the retractor mechanism, locking elements and fixing means are threaded on it, with subsequent arrangement of a securing rivet at a predetermined location or belt length, in particular using a pusher-puller combination. Thus, using a pusher-puller pair, in particular prepositioned elements can be processed in a single step with the strip of material being guided through in substantially the same manner. This is advantageously carried out continuously and more or less on the way of the second end portion to a further processing station.

Advantageously, at least one buffer unit or intermediate storage is provided between the at least two processing units. This at least one buffer unit serves the purpose of receiving textile belt material outside of respective processing areas. In an embodiment of the invention, this intermediate storage occurs between the processing unit for the first end portion and cutting, in the form of at least one hanging loop. A more or less simultaneous processing of two end portions with a substantial shortening of the overall length of a corresponding device is facilitated by an intermediate buffering, because in this way, a first end portion can already be fed to a first processing unit, for example by means of a gripper, and be processed there, while a length of the belt portion can be set, measured off, or be checked in another way at the same time. In particular in the above selected processing sequence, in which the first end portion in the first processing unit is folded and sewn together while a pin is pushed in, and in which, in the second processing unit, the pliable material is measured off and/or calibrated followed by hot separation and/or post-processing of the cutting edges, a processing in the second processing unit and a transfer to the subsequent processing track can be completed substantially simultaneously, because of the comparatively complex and time-consuming processing in the first processing unit.

In an embodiment of the invention, using a pusher, an end portion of the pliable material is threaded into a processing track and/or elements of the safety belt, such as, for example, a retractor etc. For this purpose, at least one feeder or pin plate is provided for positioning and feeding the end portions. The feeder or the pin or needle plate in particular cooperate with an auxiliary insertion means, for example in the form of guiding plates. Thus, right at the beginning of the actual processing, the first end portion can be definedly and reliably introduced from out of a length buffer by a gripper into the first processing unit via a pin plate and an auxiliary insertion means without crimping or behaving in any other undefined manner. At the same time, belt material is continued to be fed into the length buffer and the pliable material is measured off.

In the following, the invention is explained in more detail with reference to the exemplary embodiment by means of illustrations of the drawing in order to demonstrate further features and advantages. In the drawings.

Figure 1A:
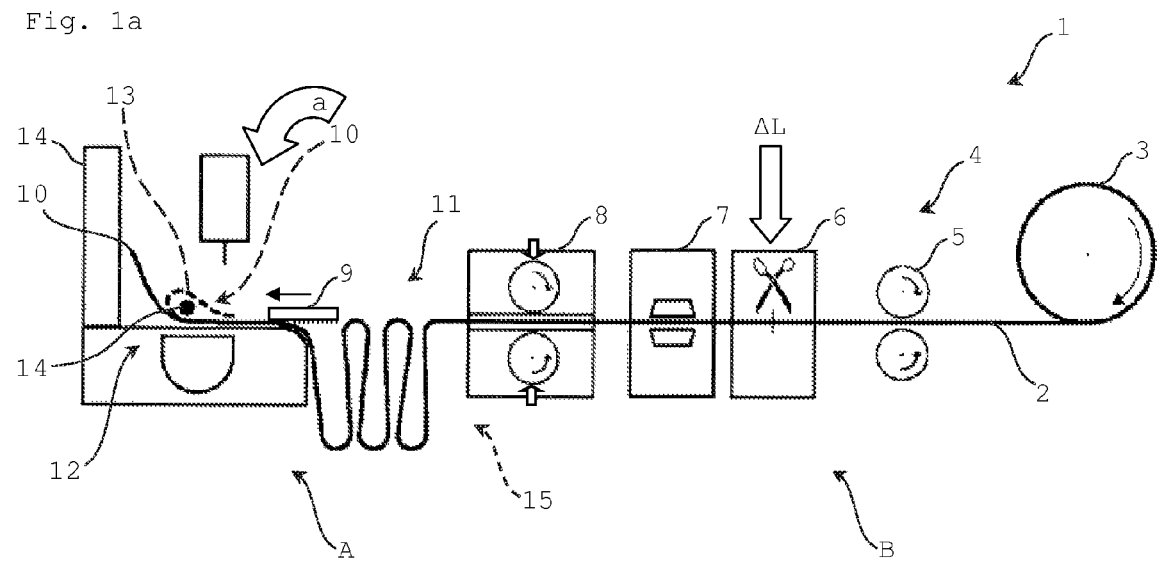
FIGS. 1a-1d show
a schematized flow diagram for illustrating a fabrication method according to the invention over different areas of a corresponding fabrication device at different time intervals.

Throughout the various illustrations of the drawing, the same designations and reference numerals are always being used for like elements and process steps. Without limiting the invention, only a manufacture of safety belts for motor vehicles is subsequently shown, which represents a primary area of use of the present invention due to the safety requirements and the annual quantities fabricated at high cost pressure.

According to the illustration of FIG. 1a, an endless belt webbing 2 is supplied as pliable material in strip form from a storage roller 3 in a first exemplary embodiment of a device 1. The belt webbing 2 passes a puller 5, a length measurement ΔL, a hot cutting device 6, a flattening device 7 for post-processing the cutting edges of the belt webbing 2 after the use of the hot cutting device 6, as well as a second puller 8. Subsequent to the second puller 8, a first end portion 10 of the belt webbing 2 is transferred, by transport means not shown in any more detail, through an intermediate buffer 11 into an automatic pin feeder 12 as a first processing unit A. The introduction of the first end portion 10 is carried out by a feeder or a pin plate 9 together with a guiding plate as an auxiliary insertion means so that bulging or twisting of the pliable material 2 during introduction into the first processing unit A is precluded. While the first end portion 10 of the belt webbing 2 is turned over in the pin feeder 12 for forming a loop 13 having defined measurements, and is fully automatically sewn together and monitored during the subsequent pushing-in of a pin 14 made of metal or plastics having a round or other cross section, belt webbing 2 is continuously conveyed through the pullers 5, 8 from the storage roller 3. When a predetermined length L is reached, this transport of belt webbing 2 is stopped, the hot cutting device 6 cuts off a section 15 of belt webbing having the length L from the belt webbing 2 while fusing or sealing the textile fabric at the cutting edges, and immediately subsequent to that, the two newly formed cutting edges are positioned and processed together in the flattening device 7. The puller 5, the hot cutting device 6 and the flattening device 7, together with the length measurement ΔL form the primary elements of a second processing unit B.

By pressing together the still warm and thus moldable cutting edges between two unheated metal plates of the flattening device 7, the two cutting edges are molded and in particular brought back to the same height as the rest of the belt webbing 2 in the process. Thus, both a second end portion 16 of the section 15 of belt webbing which is already being processed, and a first end portion 10' of a subsequent section 15' of belt webbing have been fabricated in a defined manner.

Figure 1B:
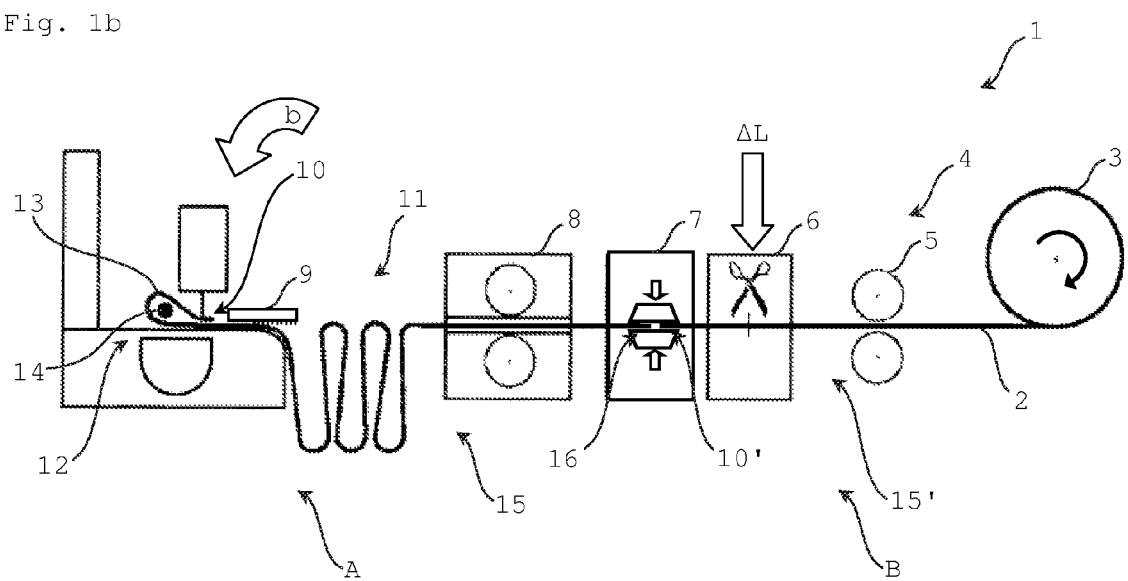

Upon opening the flattening device 7, the second end portion 16 of the belt section 15 has been released according to the illustration of FIG. 1b, and is then transferred into a second processing track 18 of the device 1, fixed in the puller 8 arranged on a pivot or feeding arm 17, which is not represented in any detailed manner in the drawing. The partial steps of function of the pin feeder 12, transport of the belt webbing 2 via the pullers 5, 8 with measuring it off to have a length L, cutting and flattening in the units 6, 7, have been carried out in a time-overlapping manner and substantially simultaneously, inclusive of the transfer by means of a pivot or feeding arm 17 and threading into a belt retractor 20. This results in time being saved, which is apparent from FIG. 3, over a purely sequential processing mode.

When the pivot or feeder arm 17 with the puller 8 has returned to its initial position shown in FIG. 1a, belt webbing 2 with a newly formed first end portion 10' of a subsequent section 15' that is still to be cut can already be inserted into the first processing track 4 from the storage roller 3 via the puller rollers 5, and conveyed onwards in the track. For this purpose, the belt webbing section 15 currently being processed need not have left the pin feeder 12 with its first end portion 10. Thus, these processes also run substantially simultaneously with each other in a time-saving manner.

Figure 1C:
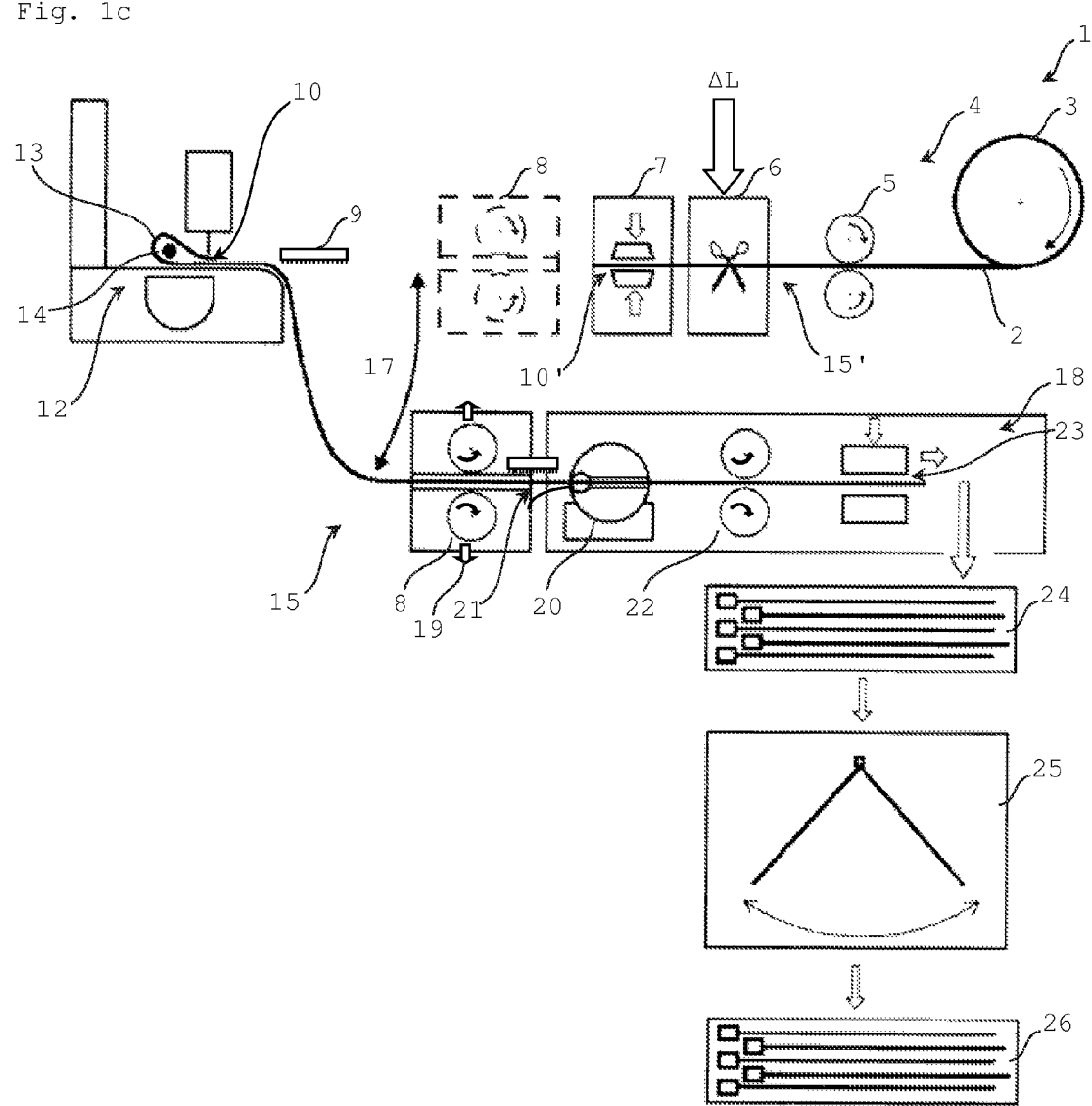

Over guiding plates, which are only outlined in the illustration of FIG. 1c, the second end portion 16 of the section 15, via a feeder or a pin plate with an auxiliary insertion means 21, is threaded through a belt retractor 20, which is prepared and positioned in a defined manner in the processing track 18, guided through it and transferred to another puller 22. Now, the puller 8, which is used here in a reversed operation as a pusher, is opened in the outlined manner in order to release the belt section 15.

The puller 22 conveys the belt section 15 until the first end portion 10, which was equipped with a pin 14 in the above-described process step, reaches the belt retractor 20 through the puller 8 which is opened along the arrows 19. Then, the belt section 15 is fixed by clamping jaws of a tensioning device 23 and subjected to tension, so that the first end portion 10 is permanently fixed in the belt retractor 20 in a known manner by clamping and is proven by this application of power that there really is a pin 14 inserted.

Upon release of the belt retractor 20 the belt material controlled by the backwards running puller 22 is rolled up slowly until after releasing a mechanical engagement about 1.5 m has been winded up automatically by the belt retractor 20. The belt section 15 thus prepared, together with the belt retractor 20, is now transferred into an intermediate buffer 24, from which these semi-finished units are supplied to a so-called pendulum test 25 for inspecting the functional performance of the belt retractor 20. All units that have passed the pendulum test are transferred to another intermediate buffer 26.

Depending on the requirements, this test 25 can also be placed at the end of a fabrication and integrated into a final test. Thus, the entire method could be accelerated even more, since, in particular, one of the two intermediate buffers 24, 26 could be dispensed with, as will be described by means of the exemplary embodiment of FIG. 2.

Figure 1D:
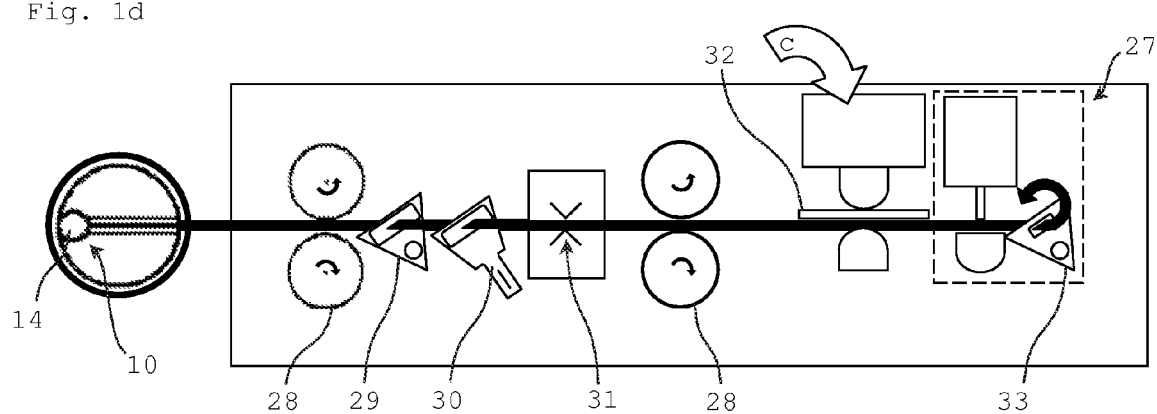

In the present exemplary embodiment, a semi-finished unit according to FIG. 1d is now be taken from the intermediate buffer 26. Here, the belt section 15 is automatically winded up to a certain length $l_1$ of about 1.5 m and fixed on the belt retractor 20, and is transferred to a final processing track 27 in this condition. Therefore, the belt section 15 is already at hand in the processing track 27, fixed and unrolled to a predetermined length $l_1$. Here, the second end portion 16 is now guided through a puller 28, a deflection device 29 and a fastening plate 30, so that these elements are more or less threaded onto the belt section 15. In order to prevent the deflection device 29 and the fastening plate 30 from slipping off in an assembly position, a plastic rivet 31 or comparable stopper is fixed at a predetermined length $l_2$. While a label 32 is being attached, the second end portion 16 is threaded through an end fitting 33, folded by a predetermined extent and sewn together. This sewing process and the attachment of the label 32 are again carried out in a time-overlapping manner with other processing steps along the track 27, so that more or less simultaneously performed partial processing steps result in the processing of the second end portion 16 of the belt section 15 also. In this regard, reference is again made to the illustration of FIG. 3.

Figure 2:
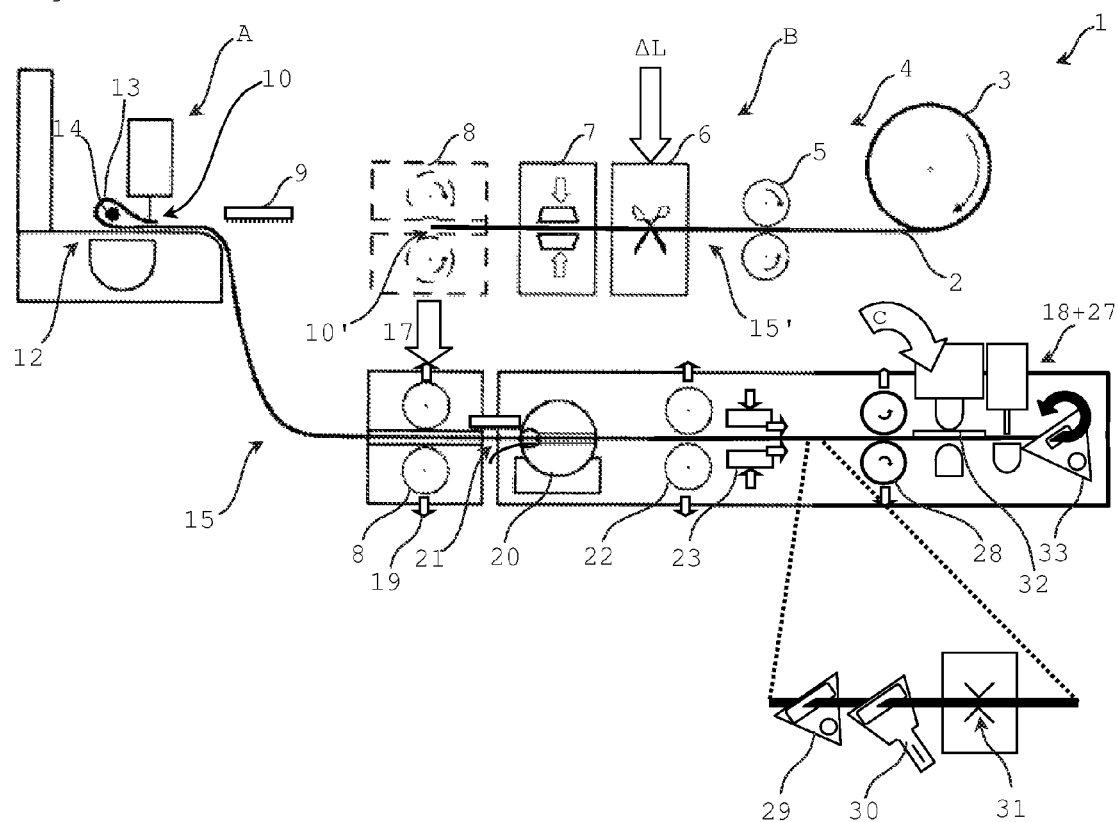
FIG. 2 shows:
a modification of the flow diagram of FIG. 1.

The schematized flow diagram of FIG. 2 represents a modification of the flow diagram of the illustrations of the FIGS. 1c and 1d. Here, the threading of the elements fastening plate 30 and a deflection device 29 over the second end portion 16 onto the belt section 15, which was described above with regard to FIG. 1d, together with the attachment of the rivet 31, was preponed to the end of the second processing track 18 of FIG. 1c. It now immediately follows, without an intermediate storage, the final processing of the second end portion 16 of the belt section 15 comprising the fixing of the end fitting 33 and the attachment of the label 32 by sewing it on at the position marked c. In the FIGS. 1a and 1b, other known positions for labels were indicated with the letters a and b, with a designating the label material being partially pushed under and into the fold of the belt material 2, and b designating the label only being sewn on.

Now follows the pendulum test 25 for inspection of the functional performance of the belt retractor 20 as well as the transfer of the finished and inspected unit into the intermediate buffer 26. These steps precede in time an optional visual final inspection and packaging.

Figure 3:
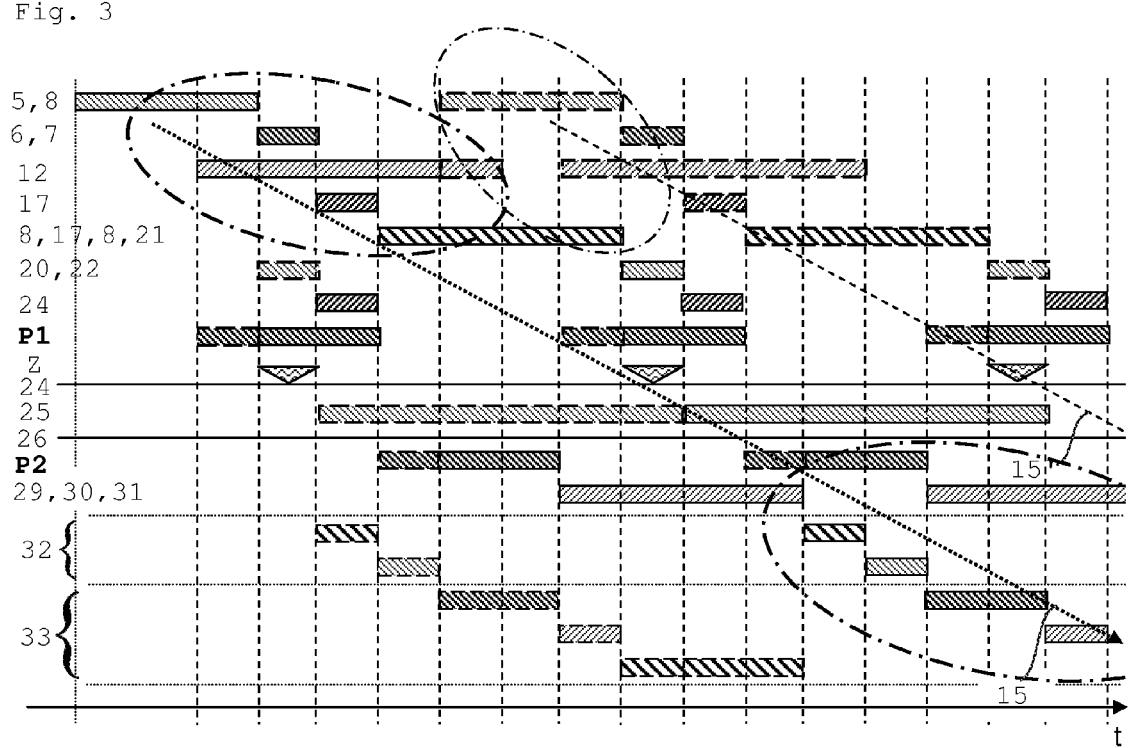
FIG. 3 shows:
an outlined schedule for demonstrating the overlap in time of individual processes of a method according to the flow diagram of FIG. 1, and FIGS. 4a-4e show:
schematized flow diagrams of only partially automated methods, the respectively required workers being indicated, with variations as regards the configuration.

FIG. 3 represents an outlined schedule for demonstrating the overlaps in time of individual processes of a method according to the flow diagram of the sequence of illustrations of the FIGS. 1a to 1d. Some of the overlaps in time with processing and method steps that run substantially simultaneously are indicated by dash-dotted ovals in a selection of essential areas. The individual partial steps are assigned to sections of the fabrication device 1 and certain elements of a finished belt unit by means of the respective reference numerals. In this manner, the method described above with respect to the illustrations of the FIGS. 1a to 1d is made traceable in terms of time by an overview, taking into consideration processes that run more or less simultaneously. Thus, a gripping of the belt material 2 and insertion into or transport via the pullers 5, 8 with automatic measuring by means of the device ΔL is followed by the transfer of the first end portion 10 to the first processing unit A. Overlapping with the folding, sewing or locking in the pin feeder 12, belt webbing 2 is continued to be fed through the pullers 5, 8 until the hot cutting device 6 and the flattening device 7 start working in order to form the belt section 15 in a defined manner and mold the end portions 16, 10' in the process. With the newly formed second end portion 16, which is free but fixed in the puller 8 after the flattening device 7 has been opened, the pivot or feeder arm 17 now proceeds from the first processing track 4 to the second processing track 18, while the sewing or locking as well as the insertion of the pin in the pin feeder 12 still continues. In this process, particular care is taken that no so-called dummy seam is produced, i.e. a connection consisting only of a strong upper thread without being durably secured in the fabric by a lower thread.

Parallel to the sewing process in the pin feeder 12, a belt retractor 20 prepared in the known manner is inserted manually or by a robot. Now, in a reversed operation as a pusher, the puller 8, together with the feeder or the pin plate and auxiliary insertion means 21, can already forward the second end portion 16 though the belt retractor 20 towards the puller 22.

According to FIG. 1c, after the first end portion 10 pulled out of the first processing unit A has been locked in position in the belt retractor 20, the intermediate buffer 24 is charged manually, access P1 by the operator. This ends a first cycle Z. This is followed by the pendulum test 25 and the insertion into the intermediate buffer 26, from which, however, an already stored semi-finished belt assembly can be taken out at the same time, access P2 by an operator. In both these accesses P1, P2 by operators, a sufficient travel time has been taken into account as a safety margin in each case, encircled in a dotted line.

According to FIG. 1d, in the third processing track 27, the deflection device 29, the fastening plate 30 and attaching the rivet 31 will now be passed through by means of the puller 28. Again, the transport of belt material of the section 15 and individual charging and processing steps overlap in the process. The attachment of the label 32 and the locking of the end fitting 33 end the processing in the device 1, a finished safety belt is taken out upon opening, among other things, the pullers 22, 28, and transferred to a final inspection in accordance with the respective intended use as well as to packaging. Here, an assured and constant quality is achieved by the above described method with a reduced working cycle time and little use of personnel.

Figure 4A:
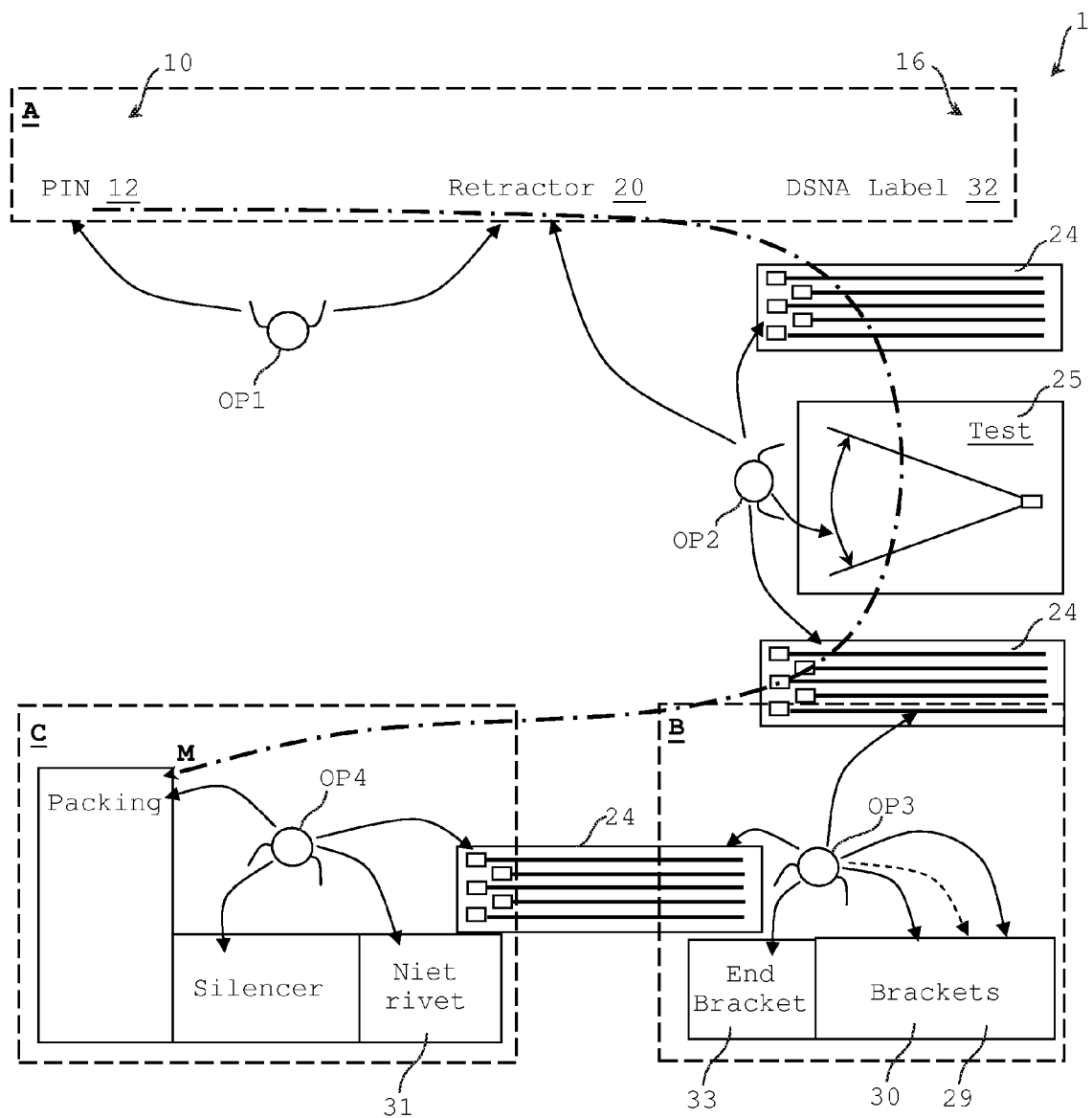

Taking an outlined complete illustration of a device 1 in FIG. 4a as a starting point, the sequence of FIGS. 4b to 4e shows schematized flow diagrams of an only partially automated method, which is modified compared to the above description, with a material flow M extending over different processing units A, B, C, or over separate work stations. The processing units A, B, C are each outlined with a variation in the configuration or functional range of a module with the required workers or operators Op1 to Op 4 being indicated respectively. While the claimed basic idea is adhered to, a device has been subdivided according to the overview of FIG. 4a into the individual processing units A to C in different degrees of detailing and with one modification.

Figure 4B:
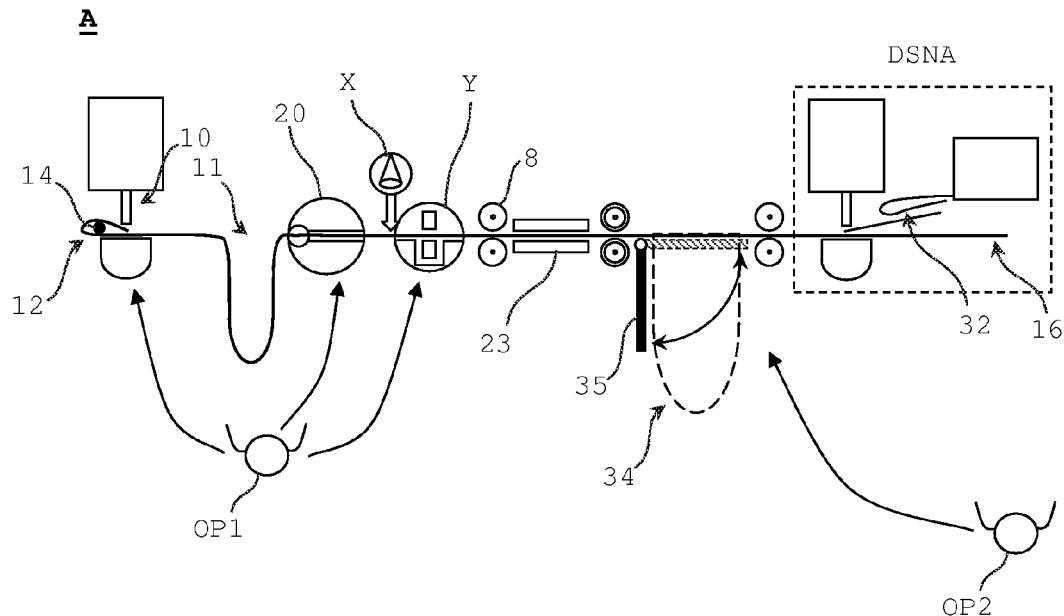

Corresponding to the representation of the FIGS. 1a to 1c, the processing unit A, after its schematic representation in FIG. 4a, is shown in concrete form in FIG. 4b. As the main difference of this new embodiment, it must be pointed out that, now, only a small part of the pliable belt material 2 needs to be pulled through the belt retractor 20 in order to feed a first free end portion 10 to the pin feeder or pin loader 12 while maintaining sufficient reserve. Parallel to this, a label 32 is already completely attached to a second end portion 16 in a PCSE-unit, which is a combined device for pressing, cutting, sewing and ejecting. Thus, work processes overlapping in time, which are carried out on the end portions 10, 16, have again been realized also in the case of a belt webbing section 15 that has been cut to length in advance or cut to a respective measurement and preprocessed on the cutting edges. In the process, the belt webbing section 15 is already equipped manually by the operator Op1 with a properly prepared and positioned belt retractor 20 during insertion.

After the completion of the sewing process on the loop or pin pocket 13 in the area of the pin feeder 12 at the one end portion 10, as well as of the label 32 on the other end portion 16, the semi-finished safety belt is taken from the processing unit A by operator Op2 and subjected to a pendulum test 25 in order to finally be transferred to an intermediate storage 25. Operator Op3 takes the semi-finished safety belt from there in order to equip it in the processing unit B with a deflection device 29, a fastening plate 30 as well as, optionally, a clip 36 to be used alternatively, depending upon the application. Finally, an end fitting 33 for fixing the safety belt in the area of a B pillar of a motor vehicle is also attached at that location. Here, the appropriate component parts have been arranged by operator Op3 in assembling aids, so-called jigs, which have the approximate form of pockets, prior to inserting the semi-finished safety belt. Optionally, one or more riveting devices may also be provided in the processing unit B, with a rivet of plastic or metal limiting a displacement of, in particular, the fastening plate 30 on the belt material. Also between the processing units B and C, a buffer or an intermediate storage hereinafter generally designated with 24 forms a transfer location which is now charged by the operator Op3 and emptied by the operator Op4. In the present exemplary embodiment, operator Op4 hereby carries out a final process in the processing unit C by attaching a so-called silencer, which prevents the fastening plate 30 from rattling after the safety belt is unfastened. The safety belt is subsequently rolled up and packaged in a defined manner by operator Op4.

FIG. 4b now shows the configuration of the processing unit A in a more concrete manner. Here, it becomes clear that two length buffers or length compensations in the form of loop depositories or intermediate buffers 11, 34 are arranged upstream from the respective sewing stations at the pin feeder 12 and the dispenser of label 32. The working processes in the pin feeder 12, as a rule, run longer than those in the area of the dispenser of label 32. The dispenser of label 32 is started upon insertion of the belt material 2. Further, spare length of belt material is conveyed through a shutter 35 by means of a puller located upstream of the shutter 35. After providing the first end portion 10 with a pin 14 this pin 14 is drawn into the belt retractor 20 by means of the puller 8 and the tensioning device 23. Provided with a label 32 the second end portion 16 is then winded onto the belt retractor 20 in a controlled manner by changing the conveying direction of the puller 8. After that this semi-finished unit is taken by operator Op2. Because of this arrangement, the intermediate buffers 11, 34 can also be emptied at least in part, while the work still continues in the area of the pin feeder 12.

Only by way of example, a mark reader X and a jig Y for receiving exactly one defined component of a safety belt are arranged upstream from the puller 8 in this embodiment of the invention, as a means for consistently implementing the poka-yoke approach. The proper orientation of the manually inserted section of pliable material is checked by the mark reader X. The assembling aids or the jig Y, as regards its construction, is configured as a receiving pocket for a component of the safety belt, such as, for example, a deflection device 29, so that no other part fits into it mechanically, and, in addition, a part that is intended to be at that position only fits in the proper orientation. The presence of a respectively intended component is checked electronically in the jig Y, with the jig Y itself being encoded, via twelve contacts in this embodiment, with its position within the fabrication device both by means of hardware as well as by software, so that it can be checked, fully automatically within the context of a central electronic inquiry, for its presence and type, as well as for its position within a fabrication line. Only in the case of positive responses, a next fabrication step is then enabled, for instance, a start of at least one sewing process. An error, such as an incorrect supply of a component to a jig Y can thus also be specifically indicated to an operator Op and corrected correspondingly quickly.

Figure 4C:
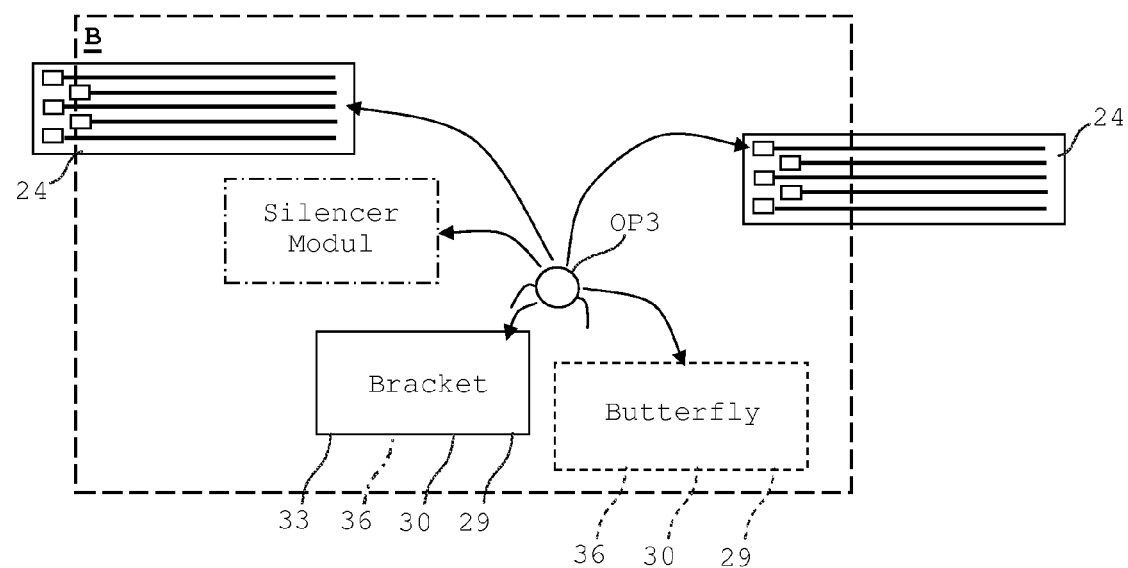

For the purpose of indicating the flexibility of fabrication and the quick adaptation to product changes as well as other applications, processing unit B is shown in two embodiments: In the illustration of FIG. 4c, a processing is shown in principle of a second end portion 16 with a longitudinally sewn fold, a so-called butterfly, for reducing the width of the belt near an end fitting 33. A so-called silencer module can optionally be incorporated into the processing unit B, also by the operator Op3, or beyond the intermediate storage 24 in the processing unit C by operator Op4.

Figure 4D:
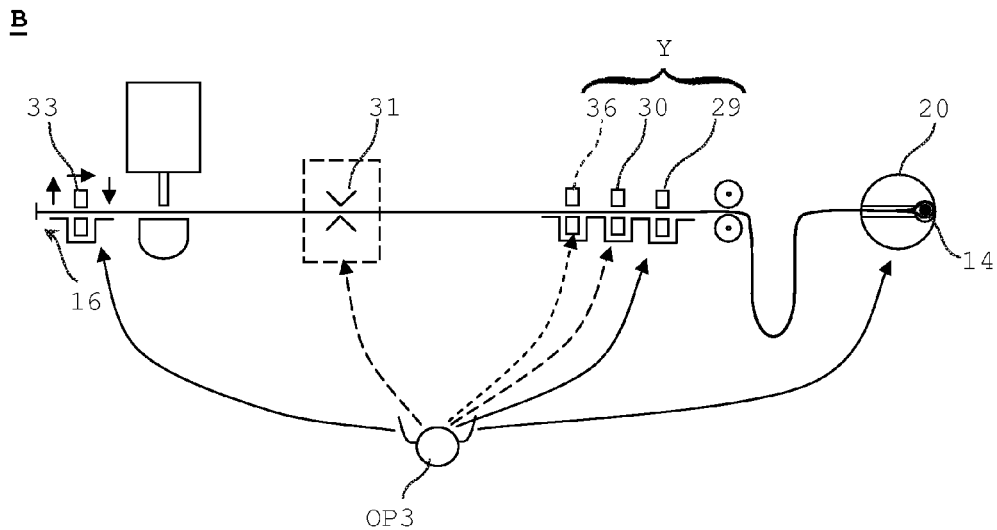

FIG. 4d shows in detail partial steps for threading various locking elements or brackets, with an optional riveting being indicated, as they are provided between the buffer depositories 24 on a work line given an only partially unrolled belt retractor 20. In this embodiment, a maximum of three jigs Y per one component per application are arranged slidably over a length 1 of belt and electronically encoded.

In addition, an end fitting 33 here is manually threaded on by the operator Op3. A free second end portion 16 is then folded with an automatic length measurement and subsequent sewing, but again, without an intervention by an operator Op. Thus, the jigs Y and the assembly as well as the fixing of an end fitting 33 is completely verifiable both mechanically as well as electronically, in order to make a fabrication clearly documentable at freedom of adaption and change to a larger extent, even given the freedom of predictable errors.

Figure 4E:
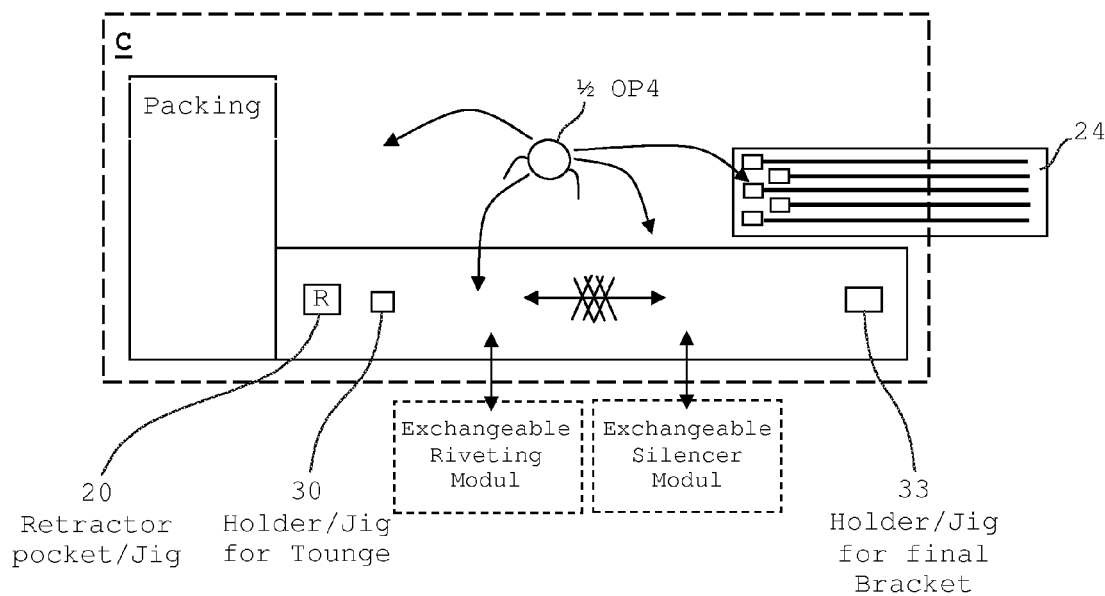

According to FIG. 4e, the processing unit C depicts final processing steps, also with options in the form of exemplified riveting and silencer modules being shown. These modules are arranged displaceably with regard to length or position between jigs Y along the working length within the processing unit C in the indicated manner, in order to receive the fastening plate 30 on the one hand, and the end fitting 33 on the other hand. Here, the receiving means or jigs play the role of retaining elements for fixing a relative position, because these elements are already mounted on the safety belt.

LIST OF REFERENCE NUMBERS 1 device
2 belt webbing/pliable material
3 storage roller
4 first processing track
5 puller
6 hot cutting device
7 flattening device
8 puller
9 feeder/pin plate
10 first end portion
   10' first end portion of a subsequent section 15'
11 intermediate buffer
12 pin feeder
13 loop
14 pin
15 belt section
   15' subsequent section 16 second end portion
17 pivot or feeding arm
18 second processing track
19 arrow
20 belt retractor
21 auxiliary insertion means
22 puller
23 tensioning device
24 intermediate buffer
25 pendulum test
26 intermediate buffer
27 third/final processing track
28 puller
29 deflection device
30 fastening plate
31 rivet/stopper
32 label
33 end fitting
34 intermediate buffer
35 shutter
36 clip
A first processing unit
B second processing unit
C third processing unit
ΔL length measurement
a, b, c position with different sewed labels
P1, P2 operators access
z cycle tune
Op operator
DSNA combined print-/cut-/sew- and eject device
Y jig coding and hart-/software checking
X mark reader

The invention claimed is:

1. Method for processing belt material having a first and a second end portion, where the two end portions (10, 16) of the belt material (2) are processed substantially simultaneously, and in a different manner during the transport of the belt material in its longitudinal direction;
wherein at least a folding and/or sewing process is part of one of the manners of processing, characterized in that in a first processing unit, the first end portion (10) is folded and sewn together while a pin (14) is inserted, and that, substantially simultaneously with the processing steps in the first processing unit, the belt material (2), in a second processing unit, is measured off and/or calibrated to a defined length with subsequent cutting the belt to have a second end portion.

2. Method according to claim 1, characterized in that the two end portions (10, 16) of the belt material (2) are manually introduced into and/or positioned in associated modules (A, B, C) by an operator (Op1, Op2, Op3, Op4).

3. Method according to claim 1, where said belt cutting is performed by hot separation and post-processing of cut edges.

4. Method according to claim 1, characterized in that the post-processing of a cut edge is carried out in the form of a flattening process or a heat deformation.

5. Method according to claim 1, characterized in that the preprocessed belt material (2) is pulled out of a first processing unit while the second end portion (16) of the belt material is threaded into and guided through a retractor mechanism (20).

6. Method according to claim 5, characterized in that, following the passing of the second end portion (16) being guided through the retractor mechanism (20), fastening plate (30) and fixing means or a deflection device (29) are threaded on, with subsequent arrangement of a securing rivet (31) or of a comparable stopper.

7. Method according to claim 1, characterized in that the belt material (2) is intermediately buffered in a space-optimized manner at least outside of an area about to be processed, in particular in the form of at least one hanging loop.

8. Method according to claim 1, characterized in that, following a hot separation of the belt material (2), the newly formed end portions (16, 10) are molded at the same time in a joint step, in particular in a flattening device (7).

9. Method according to claim 1, characterized in that the end portion (10, 16) is positioned and fed using a feeder or a pin plate (9), in particular together with an auxiliary insertion means.

10. Method according to claim 1, characterized in that a puller (8), in a second processing track (18), is operated reversibly as a pusher.

11. Device for processing textile belt material, having at least two processing units (A, B) provided for substantially simultaneously processing a first end portion (10) and a second end portion (16), characterized in that in a first processing unit, there are means for folding, sewing together the first end portion (10) and inserting a pin (14), and in a second processing unit there are means for measuring off and/or calibrating the belt material (2) to a defined length with subsequent cutting the belt to have a second end portion, wherein means for transport in the longitudinal direction of the textile belt material are provided.

12. Device according to claim 11, characterized in that, between the at least two processing units (A, B), at least one buffering unit (24, 26, 34) is provided for receiving belt material (2) outside of processing areas.

13. Device according to claim 11, characterized in that, as a means of the transport of the textile belt material in its longitudinal direction, at least one feeder or pin plate (9) is provided for positioning and feeding the end portions (10, 16), which in particular cooperates with an auxiliary insertion means.

14. Device according to claim 11, characterized in that a reversibly operable puller (8) is arranged on a pivot or feeding arm (17) for transferring an end portion (16) of the section (15) from one processing track (4) into another processing track (18).

15. Device according to claim 11, characterized in that at least one assembling aid (x), which is mechanically and electronically encoded, is provided approximately in the form of pockets for receiving exactly one defined locking element.

* * * * *